Figure 1:
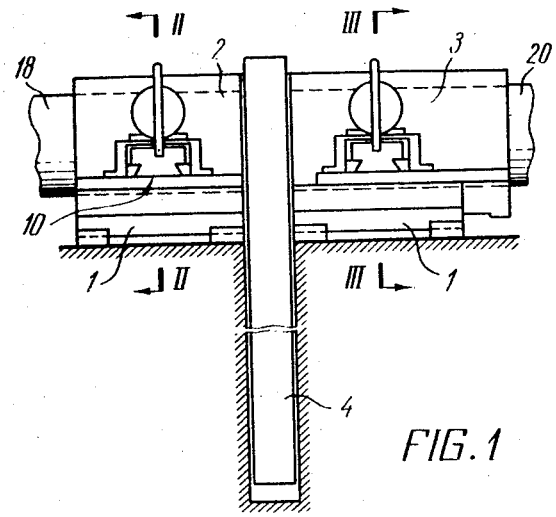

United States Patent [19]
Kochinashvili et al.

[11] 3,747,456
[45] July 24, 1973

[54] DEVICE FOR CUTTING ROLLED PRODUCTS

[76] Inventors: Alexei Vladimirovich Kochinashvili; Tenaiz Alexeevich Kochinashvili, both of prospekt I. Chavchavadze, 51, kv. 24, Tbilisi, U.S.S.R.

[22] Filed: Mar. 22, 1972

[21] Appl. No.: 237,136

[52] U.S. Cl. ............ 83/404, 83/228, 83/373, 83/441, 83/444, 83/461, 83/622
[51] Int. Cl. ......... B26d 3/20, B26d 5/20, B26d 7/02
[58] Field of Search ............... 83/404, 228, 218, 83/441, 622, 373, 227

[56] References Cited
UNITED STATES PATENTS
3,039,343 6/1962 Richards .................. 83/622 X
3,074,304 1/1963 Cole ........................ 83/622 X
3,610,492 10/1971 Bourgeois ................. 83/622 X

*Primary Examiner*—Frank T. Yost
*Attorney*—Holman & Stern

[57] ABSTRACT

A device comprising a bottom and top cutting plates interconnected with the aid of a rigid joint, arranged parallel to each other and allowed to reciprocate in the cutting plane between two split guide sleeves, one of which is stationary and the other travels along the axis of rolled products with the sleeves encompassing and directing the rolled products (bars) into the cutting zone and with each sleeve fitted with clamps to locate the bars during the cutting process.

1 Claim, 9 Drawing Figures

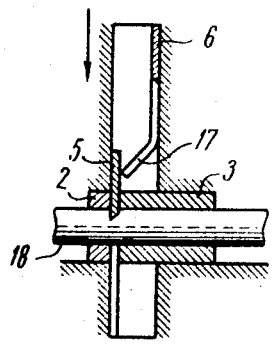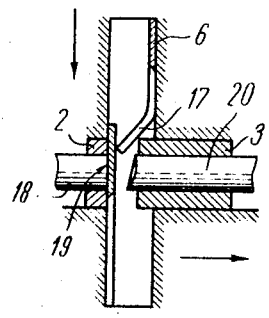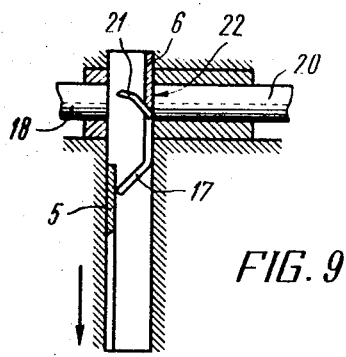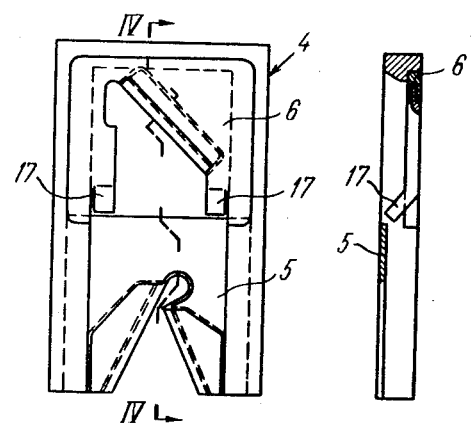

3,747,456

DEVICE FOR CUTTING ROLLED PRODUCTS

The present invention relates to the art of cutting hot rolled products of different size and outline.

Widely known is a device for cutting rolled products, comprising bottom and top cutting plates fixed rigidly parallel to each other on a frame set up to reciprocate in the cutting plane between two guide sleeves encompassing the rolled products and mounted stationary on a housing to direct the rolled products into a cutting zone.

With the known device the process of severing the rolled products in the hot state is effected as follows.

On being conveyed by a roll table the heated rolled products are freely set up in the guide sleeves.

The frame together with the cutting plates fastened thereon reciprocates in a plane normal to the axis of the rolled products. As the frame moves forward, the bottom cutting plate severs the rolled products (a bar) producing thereby one cut-off face of adequate quality.

Another out-off face is obtained with the aid of the top cutting plate with the frame proceeding with its translatory motion.

Next the frame together with the cutting plates is returned into its original position to repeat the cutting cycle.

However typical of this device are comparatively large cutting forces developed during the cutting operation. This results in a distortion of original geometry of the rolled products, rougher parting surface and in the formation of burrs. In addition there are large losses of metal in chips. All this ensues from the absence of conditions for free metal flow during the cutting operation which hinders normal deformation of the metal.

The present invention has the object to develop a device for cutting hot rolled products or bars whose design would allow free flowing of metal in the course of cutting, reducing thereby the cutting force, maintaining original geometry of the rolled products, obtaining fine and accurate surface finish and decreasing substantially the loss of metal in chipping.

According to the specified and other objects of this invention in a device for cutting rolled products or bars comprising a bottom and top cutting plates fixed rigidly parallel to each other on a frame arranged so that it is free to reciprocate in the cutting plane between two guide sleeves mounted on a housing to direct the rolled products into the cutting zone conforming to this invention the guide sleeves are split along their longitudinal axis and are provided with clamps to make the bars fast in the sleeves in the course of the cutting operation with the guide sleeve on the side of the top cutting plate set up so that it is capable of travelling along the bar axis and with a master form fixed rigidly under the top cutting plate to interact with the said guide sleeve as the frame moves forward.

The above arrangement enables the production of satisfactory and accurate surface finishes along with a reduction in metal losses with chips.

Figure 2:
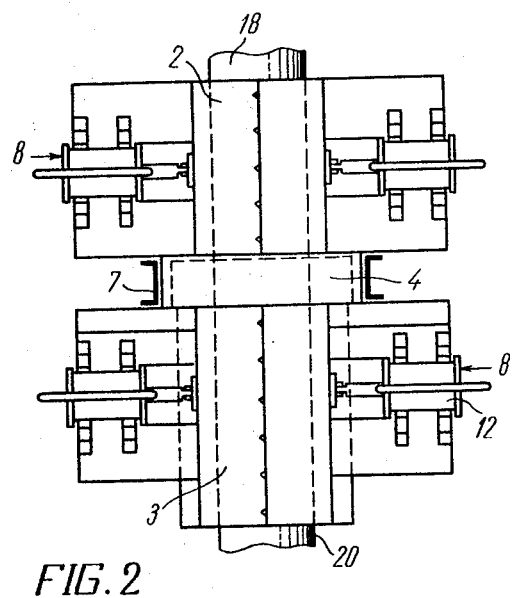
Figure 3:
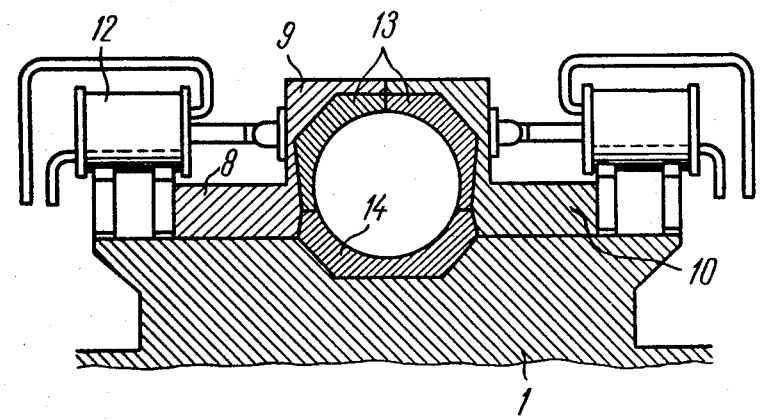
Figure 4:
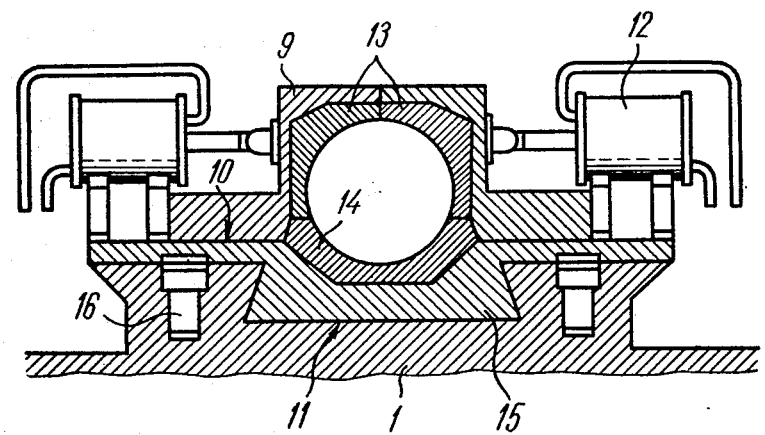

To make the present invention more clear cited below is an exemplary embodiment to be considered with due reference to the appended drawings in which:

FIG. 1 shows a lateral view of a device conforming to the invention;
FIG. 2 — ditto, a top view;
FIG. 3 — ditto, section II—II of FIG. 1;
FIG. 4 — ditto, section III—III of FIG. 1;
FIG. 5 depicts a bottom and top cutting plates conforming to this invention (front view);
FIG. 6 — ditto, section IV—IV of FIG. 5;
FIG. 7 is a schematic showing the rolled products (bar) cut with a bottom cutting plate conforming to the present invention (side view);
FIG. 8 is a schematic illustrating a guide sleeve taken aside by a master form, conforming to this invention, (side view);
FIG. 9 is a schematic showing a bar cut with a top cutting plate conforming to this invention (side view).

A device for cutting rolled products incorporates housing 1 (FIG. 1) with mounted on it guide sleeves 2 and 3 through which the bars are supplied.

Arranged between guide sleeves 2 and 3 in a plane normal to the bar axis is frame 4 with rigidly fixed on it in parallel with one another bottom and top cutting plates 5 and 6 respectively.

Frame 4 is capable of reciprocating between guide sleeves 2 and 3 along guides 7 (FIG. 2) with the aid of a drive (not shown in the drawing).

Guide sleeves 2 and 3 are of the split construction and each of them mounts clamps 8 which serve to fix the bar and comprise rests 9 set up on slides 10 arranged in guide slots 11 of housing 1. Clamps 8 are mechanically linked with pneumatic drive 12 installed on housing 1. Guide sleeves 2 and 3 are fitted with segmental bushes 13 and 14 (FIG. 4) intended for readjusting the device for different outlines and sizes of the rolled products being treated.

Sleeve 3 is coupled with the housing by means of dovetail 15, by which virtue it can travel along the bar axis.

In order to locate movable guide sleeve 3 in a working position housing 1 incorporates electromechanical blocking devices 16.

Bottom cutting plate 5 has a wedge-shaped recess with a half-ring at the angle vertex.

Top cutting plate 6 is located in the cutting plane with its cutting edge being arranged at an angle to a plane perpendicular to the cutting plane. The cutting edges of both cutting plates are ground on the side facing the bar ends being cut off.

Fixed rigidly in the middle part of frame 4 under top cutting plate 6 is master form 17 designed to turn aside guide sleeve 3 into a working position (to effect the cutting action by top cutting plate 6) with frame 4 moving forward.

The device functions as follows.

Moving on a roll table from the side of stationary guide sleeve 2 hot rolled products 18, for example, of round profile (bars) are delivered into guide sleeves 2 and 3. On being introduced there at a certain depth they are clamped by feeding compressed air into air-operated cylinders 12 whose rods shift rests 9 which grip detachable segmental bushes 13 and 14 around the body of bar 18.

After bar 18 has been placed in the device, frame 4 is set in motion; as the frame moves downward bottom cutting plate 5 effects the first step in severing bar 18 over cutting plane 19 (FIG. 8). Guide sleeve 3 together with clamped in it cut off part 20 of the bar is taken aside at that at a distance equal to 1.5–3.0 of the thickness of bottom cutting plate 5.

As frame 4 advances further master form 17 comes in contact with guide sleeve 3 diverting it in a working position in which the bar is cut by top cutting plate 6;

guide sleeve 3 is fixed in this position by electromechanical blocking devices 16.

Then top cutting plate 6 slits distorted part 21 from cutoff part 20 of the bar over cutting plane 22 (FIG. 9).

Following this frame 4 with cutting plates 5 and 6 returns into its original position, electromechanical blocking devices 16 are de-energized and under the influence of a return gear (not shown in the drawing) guide sleeve 3 returns in its original position. Under the action of air-operated cylinders 12 rests 9 are separated and bar 18 is again fed into the device pushing out cut off part 20 of the bar. After that the cycle is repeated.

The proposed device for cutting hot rolled products reduces appreciably the cutting force, enables the production of high quality and accurate cutting surfaces on either end of the rolled products and decreases the loss of metal.

What is claimed is:

1. A device for cutting rolled products (bars) incorporating: a housing, the first guide sleeve split along its longitudinal axis, fixed rigidly along the bar axis on the said housing and designed to direct the bars into the cutting zone; the second guide sleeve also split along its longitudinal axis and set up on the said housing to be free to travel along the bar axis; clamps mounted on the said first and second guide sleeves and intended to locate the bars in the sleeves during the cutting operation; a frame allowed to reciprocate in the cutting plane between the said first and second guide sleeves; a bottom cutting plate rigidly fixed in the lower part of the said frame on the side of the said first guide sleeve; a top cutting plate rigidly fixed in parallel with the said bottom cutting plate in the upper part of the said frame; a master form rigidly fixed in the middle part of the said frame under the said top cutting plate and designed to interact with the said second guide sleeve with the frame moving forward.

* * * * *